(12) United States Patent
Takano et al.

(10) Patent No.: US 10,860,035 B2
(45) Date of Patent: Dec. 8, 2020

(54) TRAVEL HISTORY STORAGE METHOD, METHOD FOR PRODUCING TRAVEL PATH MODEL, METHOD FOR ESTIMATING LOCAL POSITION, AND TRAVEL HISTORY STORAGE DEVICE

(71) Applicant: Nissan Motor Co., Ltd., Yokohama (JP)

(72) Inventors: Hiroyuki Takano, Kanagawa (JP); Motonobu Aoki, Kanagawa (JP); Naoki Kojo, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 16/482,129

(22) PCT Filed: Feb. 2, 2017

(86) PCT No.: PCT/JP2017/003722
§ 371 (c)(1),
(2) Date: Jul. 30, 2019

(87) PCT Pub. No.: WO2018/142527
PCT Pub. Date: Aug. 9, 2018

(65) Prior Publication Data
US 2019/0391594 A1    Dec. 26, 2019

(51) Int. Cl.
*G05D 1/02*    (2020.01)
*B60W 40/10*    (2012.01)
(Continued)

(52) U.S. Cl.
CPC ........... *G05D 1/0274* (2013.01); *B60W 40/10* (2013.01); *G05D 1/0088* (2013.01);
(Continued)

(58) Field of Classification Search
CPC ..... G05D 1/0274; B60W 40/10; G01C 21/32; G01C 21/3484
See application file for complete search history.

(56) References Cited

U.S. PATENT DOCUMENTS 6,098,015 A    8/2000 Nimura et al.
8,600,650 B2 *  12/2013 Zaitsu .................. G08G 1/0104
                                              180/169
(Continued)

FOREIGN PATENT DOCUMENTS

JP    H09287968 A    11/1997
JP    2003-121180 A    4/2003
(Continued)

OTHER PUBLICATIONS

Luliang Tang et al., "Lane-Level Road Infonnation Mining from Vehicle GPS Trajectories Based on Nalve Bayesian Classification", ISPRS International Journal of Geo-Information, vol. 4, No. 4, Nov. 26, 2015 (Nov. 26, 2015), pp. 2660-2680.

*Primary Examiner* — Michael J Zanelli
(74) *Attorney, Agent, or Firm* — Young Basile Hanlon & MacFarlane, P.C.

(57) ABSTRACT

A method of storing a travel history uses a controller to store the travel history of a vehicle in a storage device for each link of a traveling path. The method includes determining that one or more travel histories in a link are one type or two or more types of travel histories on the basis of a predetermined determination condition and storing the two or more types of travel histories in the link in the storage device so as to be sorted for the determined two or more types.

6 Claims, 5 Drawing Sheets

(51) Int. Cl.
*G05D 1/00* (2006.01)
*G07C 5/08* (2006.01)

(52) U.S. Cl.
CPC ......... *G05D 1/0212* (2013.01); *G07C 5/0841* (2013.01); *B60W 2520/06* (2013.01); *B60W 2520/10* (2013.01); *G05D 2201/0213* (2013.01)

(56) References Cited

U.S. PATENT DOCUMENTS

| | | | |
|---|---|---|---|
| 8,825,364 B2 * | 9/2014 | Nakao | G01C 21/30 701/414 |
| 2014/0372022 A1 | 12/2014 | Witmer | |
| 2015/0094941 A1 | 4/2015 | Chapman et al. | |
| 2016/0098496 A1 | 4/2016 | Joshi et al. | |

FOREIGN PATENT DOCUMENTS

| | | | |
|---|---|---|---|
| JP | 2012221291 A | 11/2012 | |
| JP | 2014106068 A | 6/2014 | |
| JP | 2015076077 A | 4/2015 | |
| JP | 2016075905 A | 5/2016 | |
| WO | 2012089282 A1 | 7/2012 | |

\* cited by examiner

TRAVEL HISTORY STORAGE METHOD, METHOD FOR PRODUCING TRAVEL PATH MODEL, METHOD FOR ESTIMATING LOCAL POSITION, AND TRAVEL HISTORY STORAGE DEVICE

TECHNICAL FIELD

The present invention relates to a method of storing a travel history, a method of generating a traveling trajectory model, a method of estimating a self-position, and an apparatus for storing a travel history.

BACKGROUND

To perform modeling of the structure of an intersection of a road, a technique is known which includes controlling a vehicle for data collection to travel and collect road/lane information and vehicle trajectory information, determining lane node positions from the collected data, and associating the vehicle trajectory information with a link between the determined lane node positions (see Japanese Patent Application JP2016-75905A, for example).

In practice, the same link may include two or more types of travel histories having different vehicle passing positions and/or different vehicle speeds, such as when the vehicle travels straight ahead and when the vehicle turns to the right. In such a case, if two or more types of travel histories existing in the same link are stored in a storage device without being sorted, the accuracy of a process using the travel histories (such as a process of estimating the self-position of a traveling vehicle or a process of generating a traveling trajectory model of a vehicle) may deteriorate.

SUMMARY

A problem to be solved by the present invention is to provide a method and an apparatus for storing a travel history that are able to improve the accuracy of a process using travel histories of a vehicle stored in a storage device.

The present invention solves the above problem through determining that one or more travel histories in a link are one type or two or more types of travel histories on the basis of a predetermined determination condition and storing the two or more types of travel histories in the link in a storage device so as to be sorted for the determined two or more types.

According to the present invention, the two or more types of travel histories which are determined as different types of travel histories are stored in the storage device so as to be sorted and, therefore, processes such as a process of estimating the self-position of a traveling vehicle can be carried out using a travel history in line with the actual traveling trajectory of the vehicle. It is thus possible to improve the accuracy of a process using travel histories of the vehicle stored in the storage device.

DETAILED DESCRIPTION

Figure 1:
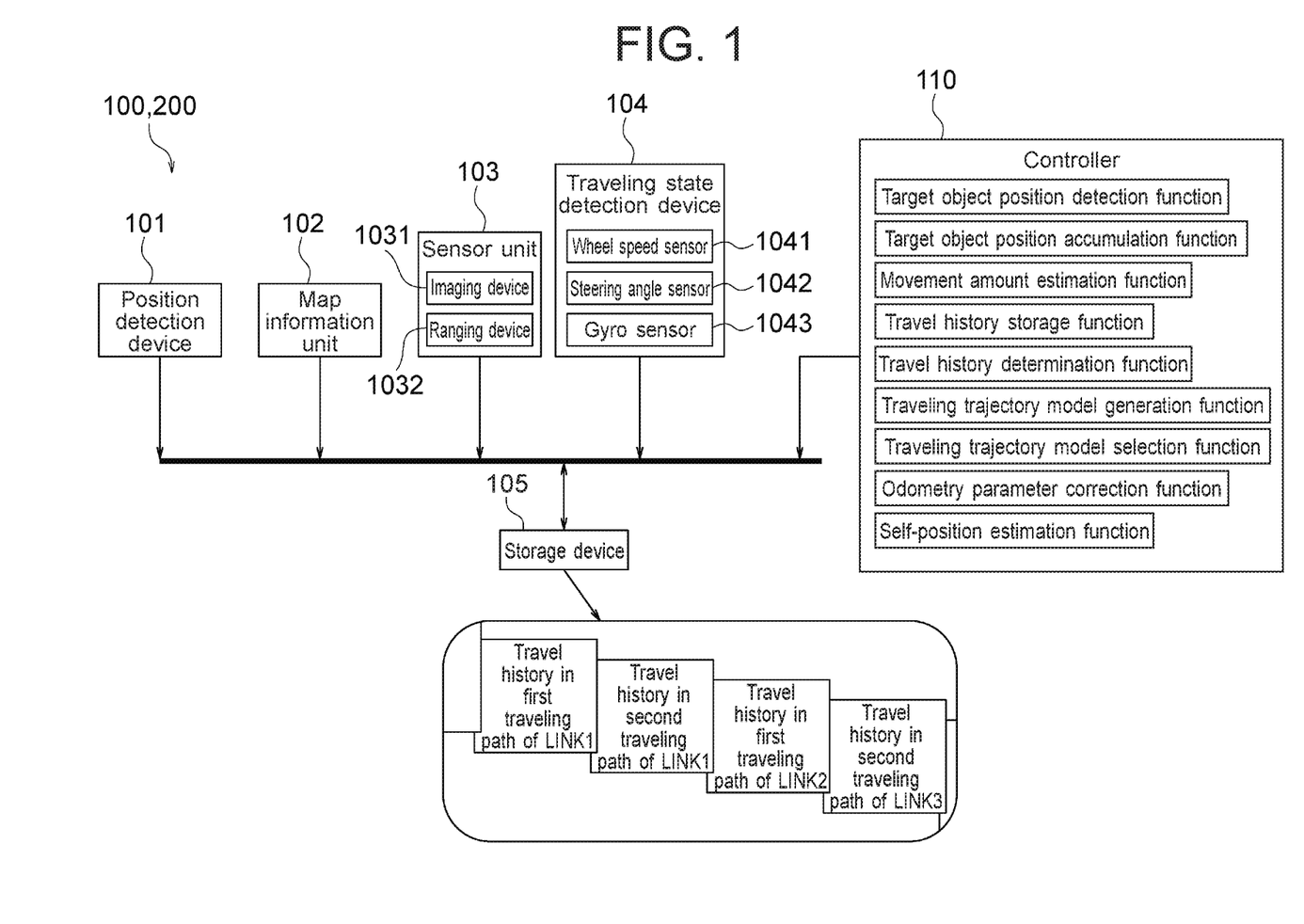
FIG. 1 is a block diagram illustrating the schematic configuration of a travel history storage system according to one or more embodiments of the present invention and a self-position estimation system to which the travel history storage system is applied.

Hereinafter, one or more embodiments of the present invention will be described with reference to the drawings. FIG. 1 is a block diagram illustrating the schematic configuration of a travel history storage system 100 according to one or more embodiments of the present invention and a self-position estimation system 200 to which the travel history storage system 100 is applied. The travel history storage system 100 illustrated in the figure is a system that stores travel histories, such as passing positions and vehicle speeds of a vehicle, which are collected from the vehicle. On the other hand, the self-position estimation system 200 is a system that estimates the self-position of a vehicle when the drive assist or automated or autonomous driving of the vehicle is being executed.

The travel history storage system 100 and self-position estimation system 200 (which may be referred to as "the systems according to one or more embodiments of the present invention," hereinafter) include a position detection device 101, a map information unit 102, a sensor unit 103, a traveling state detection device 104, a storage device 105, and a controller 110. In the systems according to one or more embodiments of the present invention, the position detection device 101, the map information unit 102, the sensor unit 103, the traveling state detection device 104, the storage device 105, and the controller 110 are equipped in a vehicle and connected to one another via an onboard LAN 106 such as a controller area network (CAN). It may not be essential to equip the map information part 102, the storage device 105, and the controller 110 in a vehicle, and they may be provided in a data center or the like connected to the onboard equipment via a communication network.

The position detection device 101, which includes a global positioning system (GPS) receiver equipped in the vehicle, receives radio waves from GPS satellites and detects the current position (latitude/longitude). As will be described later, the detailed position of the vehicle on a link between nodes is estimated by the self-position estimation system 200, and the accuracy of position detection by the position detection device 101 is lower than the accuracy of position estimation by the self-position estimation system 200.

The map information unit 102 includes a database that stores map information, road information, and other necessary information. The map information is a so-called electronic map that represents information in which the latitude and longitude are associated with the map information. The map information includes the road information associated with each point, positional information of target objects, and other necessary information. The road information is defined by nodes and links connecting between the nodes. The road information further includes information on intersections and branching points. Intersections and branching points are associated with nodes and links.

The sensor unit 103 includes an imaging device 1031 such as a wide-angle camera and a ranging device 1032 such as a laser range finder (LRF), or other similar devices. The imaging device 1031 and the ranging device 1032 are each provided at a bonnet, a bumper, a number plate, a headlight, a side mirror, or the periphery thereof. The imaging device 1031 captures images around the subject vehicle. The ranging device 1032 emits electromagnetic waves to the surroundings of the subject vehicle and detects the reflected waves. The imaging information obtained by the imaging device 1031 and the ranging information obtained by the ranging device 1032 are output to the controller 110. The controller 110 has a target object position detection function and detects the relative position between the subject vehicle and a target object existing around the subject vehicle on the basis of the imaging information output from the imaging device 1031 and the ranging information output from the ranging device 1032. The controller 110 further has a target object position accumulation function and accumulates the information on the relative position between the detected target object and the subject vehicle in the storage device 105 so as to be associated with the map information. Here, examples of the target object include a line (such as a lane mark) on a traveling road surface on which the subject vehicle travels, a curbstone on a road shoulder, and a guardrail.

The traveling state detection device 104 includes a wheel speed sensor 1041, a steering angle sensor 1042, a gyro sensor 1043, and the like. The wheel speed sensor 1041 generates a predetermined number of pulses each time the wheel of the subject vehicle makes one rotation, and outputs the generated pulses to the controller 110. The steering angle sensor 1042, which is provided on the steering column, detects a steering angle that is a current rotation angle (steering operation amount) of the steering wheel, and outputs the detected steering angle to the controller 110. The gyro sensor 1043 detects a yaw rate occurring in the subject vehicle and outputs the detected yaw rate to the controller 110. The controller 110 has a movement amount estimation function and estimates a movement amount $\Delta P$ of the subject vehicle from the previous processing cycle at each predetermined cycle on the basis of various parameters that are output from the wheel speed sensor 1041, the steering angle sensor 1042, and the gyro sensor 1043. The estimation calculation of the movement amount $\Delta P$ of the subject vehicle corresponds to odometry measurement, which will be described later, and the various parameters that are output from the wheel speed sensor 1041, the steering angle sensor 1042, and the gyro sensor 1043 correspond to parameters used in the odometry measurement (referred to as "odometry parameters," hereinafter).

The storage device 105 includes one or more random access memories (RAMs) that serve as an accessible storage device. The controller 110 has a travel history storage function and controls the storage device 105 to store the information on the wheel speed, steering angle, and yaw rate output from the traveling state detection device 104, the movement amount $\Delta P$ of the subject vehicle estimated using the movement amount estimation function, and the position and type of a target object output from the sensor unit 103 so that they are associated with the position of the subject vehicle detected by the position detection device 101. Here, the travel history stored in the storage device 105 includes the information on the wheel speed, steering angle, and yaw rate output from the traveling state detection device 104, the movement amount $\Delta P$ of the subject vehicle estimated using the movement amount estimation function, and the position and type of a target object output from the sensor unit 103 and the information on other traveling states of the subject vehicle.

The controller 110 has a travel history determination function. When two or more types of travel histories in which the passing positions of the vehicle, the speeds of the vehicle, the attitudes of the vehicle, and the like are different from one another exist so as to correspond to the same link, the controller 110 determines the two or more types of travel histories. The travel history determination function of the controller 110 serves to specify the self-position of the subject vehicle on the map information at each predetermined cycle on the basis of the movement amount $\Delta P$ of the subject vehicle from the previous processing cycle estimated using the movement amount estimation function, the relative position between the subject vehicle and a target object detected using the target object position detection function, and the map information associated with the positional information of the target object. Then, the travel history determination function of the controller 110 serves to refer to the road information (e.g. the width of the road, the width of the lane, the position of the lane on the road, the road structure such as branch/merging or intersection, etc.) included in the map information and determine the travel history of the subject vehicle on the basis of the road information and the displacement (movement amount, movement direction, etc.) of the self-position of the subject vehicle from the previous processing cycle and from further previous processing cycles. This travel history includes the passing position of the subject vehicle in the same lane and in the same link, the speed of the subject vehicle in the same lane and in the same link, and the attitude (direction) of the subject vehicle in the same lane and in the same link as parameters.

For two or more travel histories having a difference of a predetermined threshold or more in the passing position of the subject vehicle in the same lane and in the same link, the travel history determination function of the controller 110 serves to determine that the two or more travel histories are different types of travel histories. In addition or alternatively, for two or more travel histories having a difference of a predetermined threshold or more in the speed of the subject vehicle in the same lane and in the same link, the travel history determination function of the controller 110 serves to determine that the two or more travel histories are different types of travel histories. In addition or alternatively, for two or more travel histories having a difference of a predetermined threshold or more in the yaw angle of the subject vehicle in the same lane and in the same link, the travel history determination function of the controller 110 serves to determine that the two or more travel histories are different types of travel histories. Here, when at least one of the passing position of the subject vehicle, the speed of the subject vehicle, and the yaw angle of the subject vehicle satisfies the condition of being the corresponding predetermined threshold or more, the travel history determination function of the controller 110 serves to determine that the two or more travel histories are different types of travel histories. For example, when the two or more travel histories do not have a difference of the corresponding predetermined threshold or more in the passing position of the subject vehicle in the same lane and in the same link but have a difference of the corresponding predetermined threshold or more in the speed of the subject vehicle in the same lane and in the same link, the travel history determination function of the controller 110 serves to determine that the two or more travel histories are different types of travel histories.

In addition or alternatively, when traveling paths are different ahead of a branching point or intersection, such as when traveling straight ahead and when turning to the right or left (see FIG. 2), the travel history determination function of another form of the controller 110 serves to determine that, for travel histories in a link before the branching point or intersection, the travel history corresponding to a first traveling path and the travel history corresponding to a second traveling path are different types of travel histories. In addition or alternatively, when traveling positions are different in a lane ahead of a branching point or intersection, such as on the left, around the center, on the right, and the like of the lane (see FIG. 3), the travel history determination function of another form of the controller 110 serves to determine that, for travel histories in each of a link before the branching point or intersection and a link ahead of the branching point or intersection, the travel history when the traveling position in the lane ahead is on the left, the travel history when the traveling position in the lane ahead is around the center, and the travel history when the traveling position in the lane ahead is on the right are different types of travel histories.

When two or more types of travel histories are determined using the travel history determination function, the travel history storage function of the controller 110 serves to control the storage device 105 to store the two or more types of travel histories in the same link so as to be sorted for the determined two or more types. Examples of methods of storing travel histories will be described below.

Figure 2:
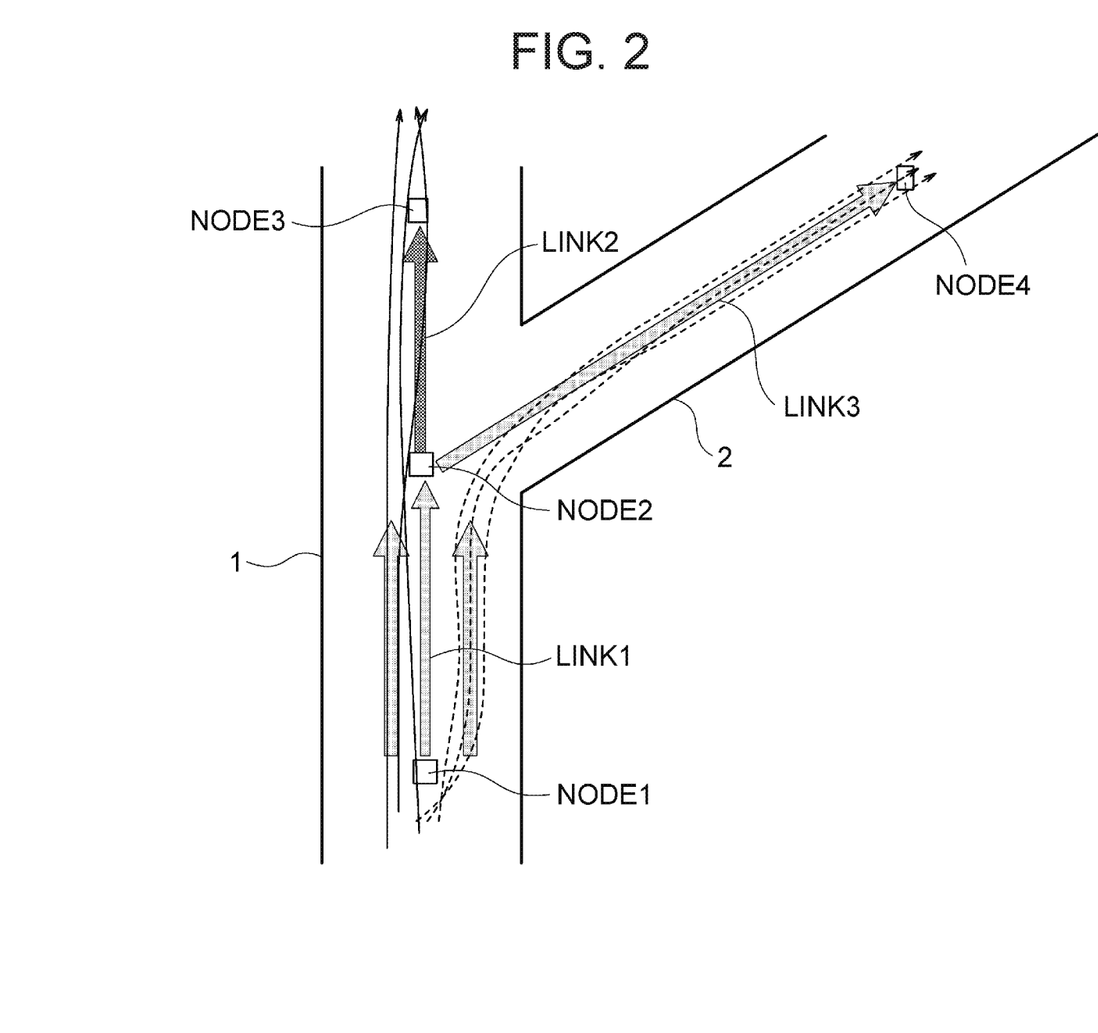
FIG. 2 is a diagram for describing an example of a method of storing travel histories.

FIG. 2 is a diagram for describing an example of a method of storing travel histories. The method of storing travel histories will be described with reference to an exemplary situation in which, as illustrated in the figure, a lane 1 for traveling straight ahead and a lane 2 branching from the lane 1 exist. In the figure, solid arrows represent traveling trajectories of the vehicle traveling straight ahead while broken arrows represent traveling trajectories of the vehicle turning to the right. In this example, the lane 1 is set with NODE1, NODE2, and NODE3 indicated by squares in the figure, and the lane 2 is set with NODE4 indicated by a square in the figure. NODE2 is set at the branching point, NODE1 is set on the upstream side of the branching point in the vehicle traveling direction, and NODE3 is set on the downstream side of the branching point in the vehicle traveling direction. In the following description, the link between NODE1 and NODE2 will be referred to as LINK1, the link between NODE2 and NODE3 will be referred to as LINK2, and the link between NODE2 and NODE4 will be referred to as LINK3.

As illustrated in FIG. 2, the vehicle traveling straight ahead and the vehicle turning to the right follow different traveling trajectories in LINK1 before the branching point (NODE2). Specifically, the passing position in LINK1 of the vehicle traveling straight ahead is located near the center of the lane 1 while the passing position in LINK1 of the vehicle turning to the right is on the right of the lane 1. In addition, the speed in LINK1 of the vehicle turning to the right is slower than the speed in LINK1 of the vehicle traveling straight ahead.

In such a situation, the travel history determination function of the controller 110 serves to determine that two types of travel histories having a difference of a predetermined threshold or more in the passing positions of the vehicle in LINK1 are two different types of travel histories. In addition or alternatively, the travel history determination function of the controller 110 serves to determine that two types of travel histories having a difference of a predetermined threshold or more in the speeds of the vehicle in LINK1 are two different types of travel histories. The travel history storage function of the controller 110 serves to control the storage device 105 to store the two types of travel histories having a difference in the passing positions and/or speeds in LINK1 so as to be sorted for the types.

In addition or alternatively, for travel histories in LINK1 on the upstream side of the branching point (NODE2), the travel history determination function of the controller 110 serves to determine that the travel history corresponding to the traveling path for traveling straight ahead and the travel history corresponding to the traveling path for turning to the right are two different types of travel histories. The travel history storage function of the controller 110 serves to control the storage device 105 to store the two types of travel histories having a difference in the traveling directions ahead of the branching point so that the travel histories are associated with LINK1 and sorted for the traveling directions.

Figure 3:
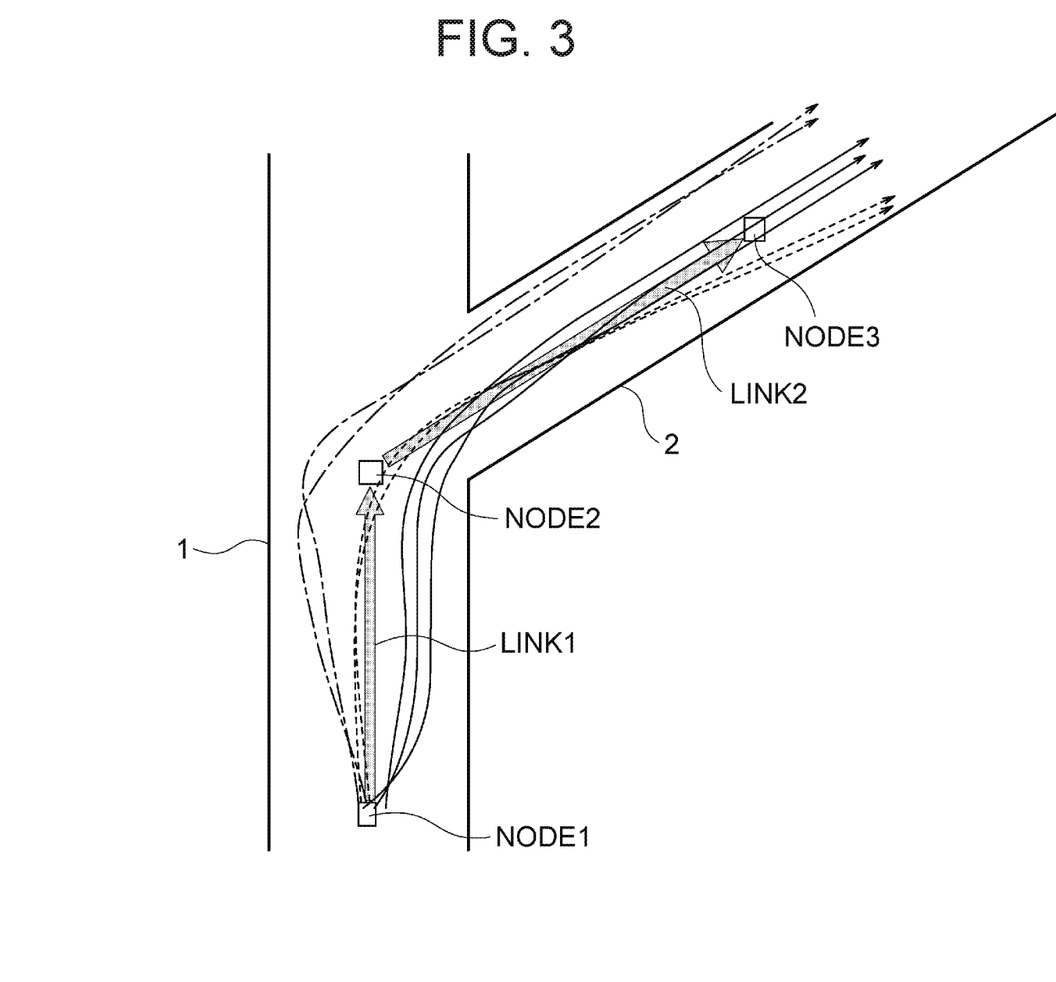
FIG. 3 is a diagram for describing another example of a method of storing travel histories.

FIG. 3 is a diagram for describing another example of a method of storing travel histories. The method of storing travel histories will be described with reference to an exemplary situation in which, as illustrated in the figure, a lane 1 for traveling straight ahead and a lane 2 branching from the lane 1 at a branching point exist and two or more traveling positions exist in the lane 2 ahead of the branching point, such as a traveling position to the left (referred to as a "traveling position 1," hereinafter), a traveling position to around the center (referred to as a "traveling position 2," hereinafter), and a traveling position to the right (referred to as a "traveling position 3," hereinafter). In the figure, solid arrows represent travel histories of the vehicle traveling to around the center of the lane 2 (to the traveling position 2), broken arrows represent travel histories of the vehicle traveling to the right of the lane 2 (to the traveling position 3), and dashed-dotted arrows represent travel histories of the vehicle traveling to the left of the lane 2 (to the traveling position 1). In this example, the lane 1 for traveling straight ahead is set with NODE1 and NODE2 indicated by squares in the figure, and the lane 2 is set with NODE3 indicated by a square in the figure. NODE2 is set at the branching point, NODE1 is set on the upstream side of the branching point in the vehicle traveling direction, and NODE3 is set on the downstream side of the branching point in the vehicle traveling direction. In the following description, the link between NODE1 and NODE2 will be referred to as LINK1 and the link between NODE2 and NODE3 will be referred to as LINK2.

As illustrated in FIG. 3, the vehicle traveling toward the traveling position 1, the vehicle traveling toward the traveling position 2, and the vehicle traveling toward the traveling position 3 follow different traveling trajectories in LINK1 before the branching point (NODE2). Specifically, the passing position in LINK1 of the vehicle traveling toward the traveling position 1 changes from near the center of the lane 1 to the left, the passing position in LINK1 of the vehicle traveling toward the traveling position 2 changes from near the center of the lane 2 to the right, and the passing position in LINK1 of the vehicle traveling toward the traveling position 3 is located near the center of the lane 1. In addition, the speed in LINK1 of the vehicle traveling toward the traveling position 1 is, for example, faster than the speed in LINK1 of the vehicle traveling toward the traveling position 2 or 3.

In such a situation, the travel history determination function of the controller 110 serves to determine that three types of travel histories having differences of a predetermined threshold or more in the passing positions of the vehicle in LINK1 are three different types of travel histories. In addition or alternatively, the travel history determination function of the controller 110 serves to determine that two or three types of travel histories having a difference or differences of a predetermined threshold or more in the speeds of the vehicle in LINK1 are two or three different types of travel histories. Then, the travel history storage function of the controller 110 serves to control the storage device 105 to store the two or three types of travel histories having a difference or differences in the passing positions and/or speeds in LINK1 so as to be sorted for the types.

In addition or alternatively, for travel histories in LINK1 on the upstream side of the branching point (NODE2), the travel history determination function of the controller 110 serves to determine that the travel history corresponding to the vehicle traveling toward the traveling position 1, the travel history corresponding to the vehicle traveling toward the traveling position 2, and the travel history corresponding to the vehicle traveling toward the traveling position 3 are three different types of travel histories. Then, the travel history storage function of the controller 110 serves to control the storage device 105 to store the three types of travel histories having differences in the traveling positions ahead of the branching point so that the travel histories are associated with LINK1 and sorted for the traveling positions.

As illustrated in FIG. 3, the vehicle traveling toward the traveling position 1, the vehicle traveling toward the traveling position 2, and the vehicle traveling toward the traveling position 3 follow different traveling trajectories in LINK2 ahead of the branching point (NODE2). Specifically, the passing position in LINK2 of the vehicle traveling toward the traveling position 1 is located on the left of the lane 1, the passing position in LINK2 of the vehicle traveling toward the traveling position 2 changes from the right of the lane 1 to near the center, and the passing position in LINK2 of the vehicle traveling toward the traveling position 3 changes from near the center of the lane 1 to the right. In addition, the speed in LINK2 of the vehicle traveling toward the traveling position 1 is, for example, faster than the speed in LINK2 of the vehicle traveling toward the traveling position 2 or 3.

In such a situation, the travel history determination function of the controller 110 serves to determine that three types of travel histories having differences of a predetermined threshold or more in the passing positions of the vehicle in LINK2 are three different types of travel histories. In addition or alternatively, the travel history determination function of the controller 110 serves to determine that two or three types of travel histories having a difference or differences of a predetermined threshold or more in the speeds of the vehicle in LINK2 are two or three different types of travel histories. Then, the travel history storage function of the controller 110 serves to control the storage device 105 to store the two or three types of travel histories having a difference or differences in the passing positions and/or speeds in LINK2 so as to be sorted for the types.

In addition or alternatively, for travel histories in LINK2 ahead of the branching point, the travel history determination function of the controller 110 serves to determine that the travel history corresponding to the vehicle traveling toward the traveling position 1, the travel history corresponding to the vehicle traveling toward the traveling position 2, and the travel history corresponding to the vehicle traveling toward the traveling position 3 are three different types of travel histories. The travel history storage function of the controller 110 serves to control the storage device 105 to store the three types of travel histories having differences in the traveling positions ahead of the branching point so that the travel histories are associated with LINK2 and sorted for the traveling positions.

As illustrated in FIG. 1, the controller 110 has a traveling trajectory model generation function and generates a traveling trajectory model for each of various travel histories stored in the storage device 105. The traveling trajectory model is a time-series arrangement of the passing positions, speeds, and the like of the subject vehicle. For example, principal component analysis is performed on the travel histories stored in the storage device 105 and the traveling trajectory model is defined using the detected principal component vectors. The traveling trajectory model includes at least the passing positions and speeds of the subject vehicle. In one or more embodiments of the present invention, the traveling trajectory model further includes the attitudes, directions, and slip angles of the subject vehicle. The slip angles can be estimated from the speeds of the vehicle and/or the attitudes of the vehicle.

Here, when two or more types of travel histories exist in the same link, two or more types of traveling trajectory models are generated for the same link. Then, the travel history storage function of the controller 110 serves to control the storage device 105 to store the two or more types of traveling trajectory models generated using the traveling trajectory model generation function so that the traveling trajectory models are associated with the link and sorted for the types.

The controller 110 has a traveling trajectory model selection function, an odometry parameter correction function, and a self-position estimation function. During execution of the drive assist or the automated or autonomous driving (this mode of execution will be referred to as an "online mode," hereinafter), the traveling trajectory model selection function of the controller 110 serves to calculate the traveling trajectory of the subject vehicle on the basis of the positions of the subject vehicle detected by the position detection device 101, the map information possessed by the map information unit 102, the information on the target objects detected by the sensor unit 103, and the movement amount $\Delta P$ of the subject vehicle estimated using the movement amount estimation function. The traveling trajectory includes at least the passing positions and speeds of the subject vehicle. In one or more embodiments of the present invention, the traveling trajectory further includes the attitudes of the subject vehicle. Then, the traveling trajectory model selection function of the controller 110 serves to read out the traveling trajectory model, which is generated using the traveling trajectory model generation function and corresponds to the traveling trajectory of the subject vehicle, from one or more types of traveling trajectory models stored in the storage device 105. Here, examples of the method of reading out the traveling trajectory model from the storage device 105 include a method of calculating inner products between a traveling trajectory vector obtained by vectorization of the traveling trajectory in the online mode of the subject vehicle and principal component vectors of the traveling trajectory models stored in the storage device 105 and reading out from the storage device 105 a traveling trajectory model that has the principal component vector giving the largest inner product with the traveling trajectory model.

The odometry parameter correction function of the controller 110 serves to calculate an error between the movement amount $\Delta P$ calculated in the odometry measurement and the actual movement amount of the subject vehicle on the basis of the movement amount $\Delta P$ from the previous processing cycle calculated in the online mode using the movement amount estimation function and the inter-node distance (link length) of the traveling trajectory model read out from the storage device 105 using the traveling trajectory model selection function. Then, the odometry parameter correction function of the controller 110 serves to correct one or more odometry parameters used in the odometry measurement so that the calculated error decreases. Examples of the method of correcting the odometry parameters include adjustment of the gain to be added to the movement amount $\Delta P$ in the odometry measurement. Here, the odometry parameter correction function of the controller 110 may serve to calculate the amount of sideslip of the subject vehicle at the time of turning on the basis of the slip angle included in the traveling trajectory model at the time of turning and adjust the gain in the odometry measurement in response to the calculated amount of sideslip.

The self-position estimation function of the controller 110 serves to estimate the self-position of the subject vehicle on the basis of the movement amount $\Delta P$ of the subject vehicle estimated in the online mode using the movement amount estimation function, the odometry parameters corrected using the odometry parameter correction function, and the map information possessed by the map information unit 102. For example, the self-position estimation function of the controller 110 serves to correct the movement amount $\Delta P$ by adding the gain adjusted using the odometry parameter correction function to the movement amount $\Delta P$ estimated using the movement amount estimation function and estimate the self-position of the subject vehicle on the basis of the corrected movement amount $\Delta P$ and the map information.

The method of estimating the self-position of the subject vehicle will be described below. This method is executed by the self-position estimation system 200. The controller 110 illustrated in FIG. 1 has the self-position estimation function. The self-position estimation according to one or more embodiments of the present invention is performed by a method (so-called odometry measurement) of calculating the moving distance and moving direction of the subject vehicle in accordance with the rotation angles and rotation angular speeds of the right and left wheels of the vehicle. In the self-position estimation method by the odometry measurement, the movement amount of the subject vehicle is estimated from the rotation angular speeds of the wheels and the gyration angle and gyration speed of the subject vehicle which are obtained from the difference between the rotation angular speeds of the right and left wheels. Unfortunately, however, depending on the conditions of the traveling path, such as the topography of the traveling path such as an upslope or a downslope and the material of the road surface, an error occurs between the estimated value of the movement amount of the subject vehicle in accordance with the rotation of the wheels and the actual movement amount of the subject vehicle. If the factors which cause the error are clarified, the error of the movement amount $\Delta P$ of the vehicle due to the odometry measurement can be reduced, but it may be difficult to accurately analyze the above factors from the conditions of the traveling path. It may also be possible to correct the odometry parameters on the basis of the relative position between a target object around the traveling path and the subject vehicle thereby to reduce the error of the movement amount $\Delta P$ of the subject vehicle due to the odometry measurement, but this cannot be carried out in a section in which the target object cannot be detected.

To overcome the above issues, the self-position estimation of the vehicle using the odometry measurement according to one or more embodiments of the present invention includes making the subject vehicle travel to collect the travel histories when the drive assist or the automated or autonomous driving is not executed (this mode will be referred to as an "offline mode," hereinafter), storing the collected travel histories in the storage device 105, generating a traveling trajectory model on the basis of the travel histories stored in the storage device 105, and correcting the odometry parameters on the basis of an error between the generated traveling trajectory model and the actual travel of the subject vehicle.

Here, when two or more types of travel histories having different vehicle passing positions and/or vehicle speeds exist in the same link, if the two or more types of travel histories are stored in the storage device 105 without being sorted, problems may occur in that the traveling trajectory model cannot be accurately generated and/or that the error of the movement amount $\Delta P$ due to the odometry measurement cannot be accurately calculated in the self-position estimation. In one or more embodiments of the present invention, therefore, when the travel histories are collected in the offline mode and stored in the storage device 105, two or more types of travel histories existing in the same link are stored in the storage device 105 so as to be sorted for the two or more types. In addition or alternatively, in one or more embodiments of the present invention, when the traveling trajectory model is generated in the offline mode, two or more types of traveling trajectory models corresponding to the two or more types of travel histories existing in the same link are generated. In addition or alternatively, in one or more embodiments of the present invention, when the self-position of the subject vehicle is estimated in the online mode, the traveling trajectory model corresponding to the traveling trajectory of the subject vehicle traveling is selected from among the two or more types of traveling trajectory models stored in the storage device 105, and the error of the movement amount $\Delta P$ due to the odometry measurement is calculated using the selected traveling trajectory model.

Figure 4:
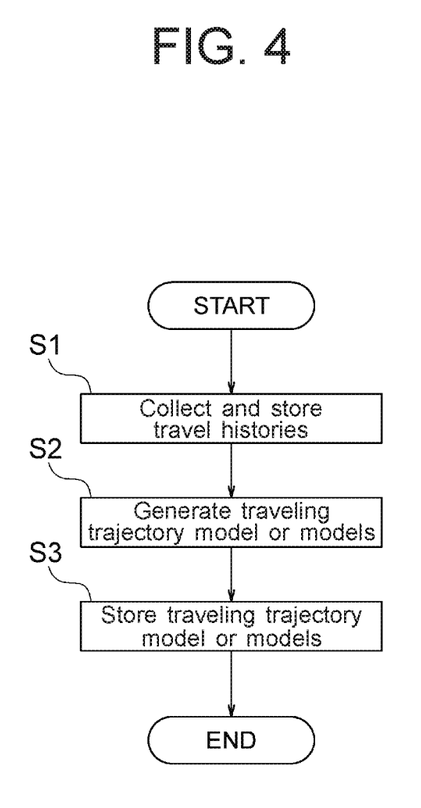
FIG. 4 is a flowchart for describing a traveling trajectory model generation method according to one or more embodiments of the present invention.

A method of generating a traveling trajectory model in the offline mode according to one or more embodiments of the present invention will first be described. FIG. 4 is a flowchart for describing a traveling trajectory model generation method according to one or more embodiments of the present invention. As illustrated in the flowchart, the subject vehicle is made to travel along a predetermined section in the offline mode, and travel histories are collected and stored in the storage device 105 (Step 1). The travel histories collected from the subject vehicle and stored in the storage device 105 include the movement amount $\Delta P$ of the subject vehicle estimated using the movement amount estimation function of the controller 110, the wheel speed, steering angle, and yaw rate output from the traveling state detection device 104, the target object information output from the sensor unit 103, and the position of the subject vehicle detected by the position detection device 101. The above predetermined section is set, for example, to any the section from NODE1 to NODE3 and the section from NODE1 to NODE4 as illustrated in FIG. 2 or the section from NODE1 to NODE3 as illustrated in FIG. 3. The number of times of collecting the travel histories in the predetermined section and storing the travel histories in the storage device 105 is at least one, but the travel histories may be collected and stored two or more times in order to improve the accuracy of the traveling trajectory model to be generated in Step 2.

Here, when the same link includes two or more types of travel histories having different passing positions and/or speeds, different traveling directions (such as traveling straight ahead and turning to the right) or different traveling positions (such as the right and the center) from the link, or the like, the travel history determination function of the controller 110 serves to determine the two or more types of travel histories (see FIGS. 2 and 3). In this case, the travel history storage function of the controller 110 serves to control the storage device 105 to store the two or more types of travel histories so as to be sorted for respective types of travel histories.

Then, a traveling trajectory model is generated from the travel histories stored in the storage device 105 (Step 2). Here, when two or more types of travel histories in the same link are stored in the storage device 105, the traveling trajectory model generation function of the controller 110 serves to generate two or more types of traveling trajectory models for the same link. Generation of the traveling trajectory model or models may be performed each time the travel history or histories are collected and stored in the storage device 105 or may also be performed after collection and recording of two or more travel histories.

Then, the traveling trajectory model or models generated in Step 2 are stored in the storage device 105 (Step 3). Here, when two or more types of traveling trajectory models are generated for the same link, the travel history storage function of the controller 110 serves to control the storage device 105 to store the two or more types of traveling trajectory models so as to be sorted for respective types.

Figure 5:
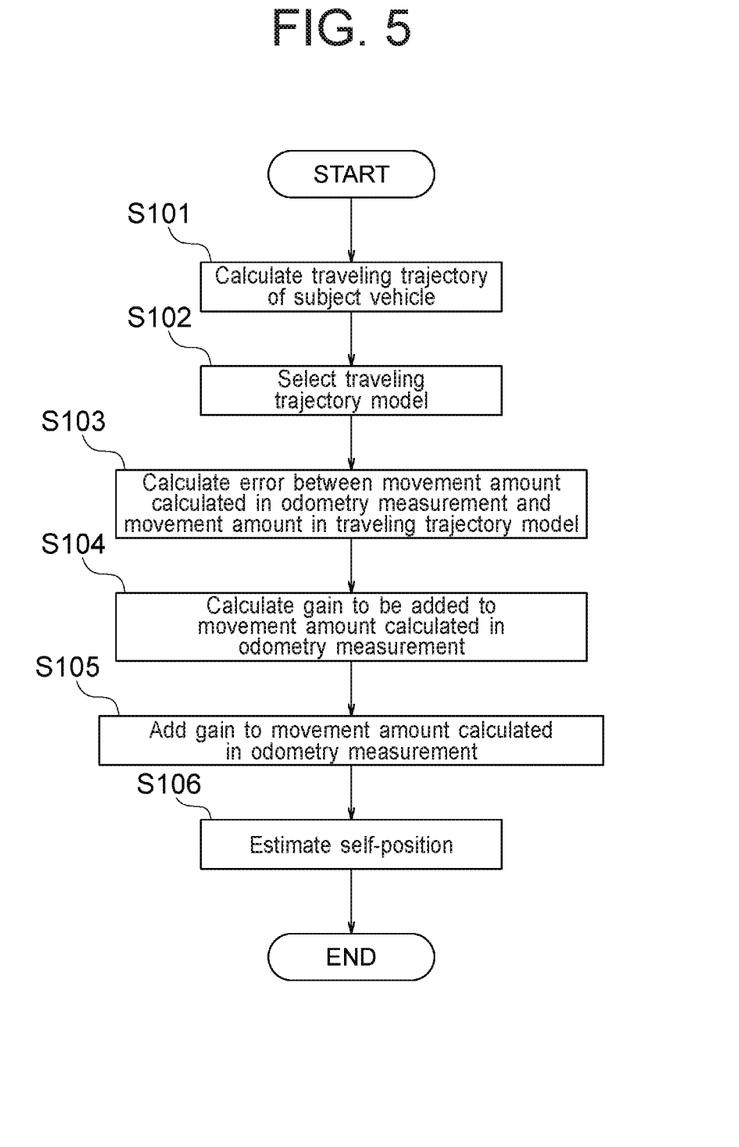
FIG. 5 is a flowchart for describing a self-position estimation method according to one or more embodiments of the present invention.

A method of estimating a self-position in the online mode will then be described. FIG. 5 is a flowchart for describing a self-position estimation method according to one or more embodiments of the present invention. As illustrated in the flowchart, the traveling trajectory model selection function of the controller 110 serves to calculate the traveling trajectory of the subject vehicle on the basis of the position of the subject vehicle detected by the position detection device 101, the map information possessed by the map information unit 102, information on the target objects detected by the sensor unit 103, and the movement amount ΔP of the subject vehicle estimated using the movement amount estimation function (Step 101).

Then, the traveling trajectory model selection function of the controller 110 serves to read out a traveling trajectory model corresponding to the generated traveling trajectory of the subject vehicle from one traveling trajectory model or two or more traveling trajectory models stored in the storage device 105 (Step 102). For example, as illustrated in FIG. 2, when the subject vehicle decelerates in LINK1 and/or passes through the right of the lane 1 to turn to the right, the traveling trajectory model selection function of the controller 110 serves to read out the traveling trajectory model indicated by a solid (broken) line from the storage device 105. Alternatively, as illustrated in FIG. 3, when the subject vehicle travels at the left position of the traveling path 2 after turning to the right, the traveling trajectory model selection function of the controller 110 serves to select the traveling trajectory model indicated by a dashed-dotted line.

Then, the odometry parameter correction function of the controller 110 serves to calculate an error between the movement amount ΔP calculated in the odometry measurement and the movement amount in the traveling trajectory model on the basis of the movement amount ΔP from the previous processing cycle calculated using the movement amount estimation function and the inter-node distance (link length) of the traveling trajectory model which is read out from the storage device 105 using the traveling trajectory model selection function (Step 103). Then, the odometry parameter correction function of the controller 110 serves to calculate a gain to be added to the movement amount ΔP calculated in the odometry measurement (Step 104).

Then, the self-position estimation function of the controller 110 serves to correct the movement amount ΔP by adding the gain adjusted using the odometry parameter correction function to the movement amount ΔP estimated using the movement amount estimation function (Step 105). Then, the self-position estimation function of the controller 110 serves to estimate the self-position of the subject vehicle on the basis of the movement amount ΔP corrected in Step 105 and the map information (Step 106).

Here, a comparative example will be discussed. In the comparative example, it is assumed that the same link includes two or more types of travel histories having different vehicle passing positions, different vehicle speeds, and the like, but nevertheless, the two or more types of travel histories are stored in the storage device 105 without being sorted in the offline mode. In the comparative example, it is also assumed that the traveling trajectory model is generated by performing principal component analysis in the offline mode on the vehicle passing positions, the vehicle speeds, and the like included in the travel histories stored in the storage device 105. In the present comparative example, it is further assumed that the self-position estimation of the traveling vehicle is carried out in the online mode using the traveling trajectory model generated in the offline mode.

In the comparative example, the traveling trajectory model generated in the offline mode may not coincide with any of the traveling trajectories in LINK1 when turning to the right, which are indicated by the broken lines in FIG. 2, and also may not coincide with any of the traveling trajectories in LINK1 when traveling straight ahead, which are indicated by the solid lines. Accordingly, when the self-position estimation of the traveling vehicle is carried out in the online mode using the traveling trajectory model generated in the offline mode, a deviation may occur between the traveling trajectory of the traveling vehicle and the traveling trajectory model both in the case of turning to the right along the traveling trajectory indicated by a broken line in the figure and the case of traveling straight ahead along the traveling trajectory indicated by a solid line in the figure. Thus, the error between the movement amount ΔP calculated in the odometry measurement and the actual movement amount of the vehicle cannot be accurately calculated, so that the accuracy of the self-position estimation of the traveling vehicle deteriorates.

In contrast, in the method of storing travel histories and the travel history storage system 100 according to one or more embodiments of the present invention, a determination is made that one or more travel histories in the same link are one type or two or more types of travel histories on the basis of a predetermined determination condition such as a passing position of the vehicle, and the two or more types of travel histories in the same link are stored in the storage device 105 so as to be sorted for the determined two or more types. It is thereby possible to generate two or more types of traveling trajectory models corresponding to the two or more types of travel histories existing in the same link and/or to carry out the self-position estimation of the traveling vehicle using the two or more types of travel histories existing in the same link. It is thus possible to generate traveling trajectory models in line with the actual traveling trajectories of the vehicle and improve the accuracy of the self-position estimation of the traveling vehicle.

In the method of storing travel histories and the travel history storage system 100 according to one or more embodiments of the present invention, a determination is made that the travel histories in the same LINK1 are two or more types of travel histories with the determination condition regarding the traveling directions of the vehicle from LINK1 (such as whether to travel straight ahead or turn to the right, for example) when the traveling path is branched ahead of LINK1 as illustrated in FIG. 2, and the two or more types of travel histories in the same LINK1 are stored in the storage device 105 so as to be sorted for the determined traveling directions. Through this operation, the traveling trajectory model in LINK1 when turning to the right from LINK1 and the traveling trajectory model in LINK1 when traveling straight ahead from LINK1 can be generated so as to be distinguishable. Moreover, when the traveling vehicle turns to the right from LINK1, the self-position estimation can be performed using the traveling trajectory model in LINK1 in the case of turning to the right, while when the traveling vehicle travels straight ahead from LINK1, the self-position estimation can be performed using the traveling trajectory model in LINK1 in the case of traveling straight ahead.

In the method of storing travel histories and the travel history storage system 100 according to one or more embodiments of the present invention, when two or more traveling positions of the vehicle to one lane 2 (LINK2) ahead of LINK1 exist as illustrated in FIG. 3, such as a traveling position on the right, a traveling position around the center, and a traveling position on the left, a determination is made that the travel histories in the same LINK1 are two or more types of travel histories, and a determination is also made that the travel histories in the same LINK2 are two or more types of travel histories, with the determination condition regarding the two or more traveling positions of the vehicle to the one lane 2. Then, in the method of storing travel histories according to one or more embodiments of the present invention, the two or more types of travel histories in the same LINK1 are stored in the storage device 105 so as to be sorted for the determined traveling positions, and the two or more types of travel histories in the same LINK2 are also stored in the storage device 105 so as to be sorted for the determined traveling positions. Through this operation, the traveling trajectory models in LINK1 and LINK2 when traveling from LINK1 to the right of the lane 2, the traveling trajectory models in LINK1 and LINK2 when traveling from LINK1 to around the center of the lane 2, and the traveling trajectory models in LINK1 and LINK2 when traveling from LINK1 to the left of the lane 2 can be generated so as to be distinguishable. Moreover, when the traveling vehicle travels from LINK1 to the right of the lane 2, the self-position estimation can be performed using the traveling trajectory models in LINK1 and LINK2 in the case of traveling to the right, when the traveling vehicle travels from LINK1 to around the center of the lane 2, the self-position estimation can be performed using the traveling trajectory models in LINK1 and LINK2 in the case of traveling to around the center, and when the traveling vehicle travels from LINK1 to the left of the lane 2, the self-position estimation can be performed using the traveling trajectory models in LINK1 and LINK2 in the case of traveling to the left.

In the method of storing travel histories and the travel history storage system 100 according to one or more embodiments of the present invention, a determination is made that the travel histories in the same link are two or more types of travel histories with the determination condition regarding the passing positions of the vehicle in the same link and the vehicle speeds in the same link, and the two or more types of travel histories in the same LINK1 are stored in the storage device 105 so as to be sorted for the determined traveling directions. Through this operation, two or more types of traveling trajectories having different vehicle passing positions and different vehicle speeds can be modeled so as to be distinguishable. Moreover, when the traveling vehicle passes through a given link at a given passing position and a given vehicle speed, the self-position estimation can be performed using the traveling trajectory model having the given passing position and the given vehicle speed.

The method of generating a traveling trajectory model according to one or more embodiments of the present invention includes determining that one or more travel histories in the same link are one type or two or more types of travel histories on the basis of a predetermined determination condition, storing the two or more types of travel histories in the same link in the storage device 105 so as to be sorted for the determined two or more types, and generating two or more types of traveling trajectory models corresponding to the two or more types of travel histories in the same link stored in the storage device 105. This allows the traveling trajectory models to be generated in line with the actual traveling trajectories of the vehicle.

The method of estimating a self-position of the vehicle according to one or more embodiments of the present invention includes generating two or more types of traveling trajectory models using the above method of generating a traveling trajectory model according to one or more embodiments of the present invention, storing the generated two or more types of traveling trajectory models in the storage device 105, selecting the traveling trajectory model corresponding to a traveling trajectory of the traveling vehicle from among the two or more types of traveling trajectory models stored in the storage device 105, and correcting an error of the movement amount of the vehicle due to the odometry measurement using the selected traveling trajectory model. Through this operation, as illustrated in FIG. 2 for example, when turning to the right from LINK1, the error of the movement amount of the vehicle due to the odometry measurement can be corrected using the traveling trajectory model in which the traveling trajectory of the vehicle turning to the right is modeled, and when traveling straight ahead from LINK1, the error of the movement amount of the vehicle due to the odometry measurement can be corrected using the traveling trajectory model in which the traveling trajectory of the vehicle traveling straight ahead is modeled. It is therefore possible to estimate the self-position of the traveling vehicle using the traveling trajectory model in line with the actual traveling trajectory of the vehicle. The accuracy in the self-position estimation of the traveling vehicle can thus be improved.

Embodiments explained heretofore are described to facilitate understanding of the present invention and are not described to limit the present invention. It is therefore intended that the elements disclosed in the above embodiments include all design changes and equivalents to fall within the technical scope of the present invention.

For example, in the above-described embodiments, the travel histories are collected and stored in the storage device 105 and the traveling trajectory model is generated and stored in the storage device 105 in the offline mode, and then the self-position estimation of the traveling vehicle is performed in the online mode using the traveling trajectory model. In an alternative embodiment, the travel histories may be collected and stored in the storage device 105 also in the online mode and the traveling trajectory model may be corrected.

DESCRIPTION OF REFERENCE NUMERALS

100 Travel history storage system
105 Storage device
110 Controller
200 Self-position estimation system

The invention claimed is:

1. A method of storing a travel history using a controller to store the travel history of a vehicle in a storage device for each link connecting between nodes in road information, the method comprising:

when traveling directions of the vehicle branch at a branching point, determining that one or more travel histories in a link on an upstream side of the branching point are one type or two or more types of travel histories on a basis of a predetermined determination condition; and storing the two or more types of travel histories in the link in the storage device so as to be sorted for the determined two or more types, wherein when a traveling path ahead of the link branches, the predetermined determination condition involves traveling directions of the vehicle ahead of the branching point.

2. The method of storing a travel history according to claim 1, wherein the predetermined determination condition involves at least one of a passing position of the vehicle in the link and a speed of the vehicle in the link.

3. A method of storing a travel history using a controller to store the travel history of a vehicle in a storage device for each link connecting between nodes in road information, the method comprising:

when two or more traveling positions of the vehicle exist in a lane ahead of a branching point, determining that one or more travel histories in a link on an upstream side of the branching point and in a link ahead of the branching point are one type or two or more types of travel histories on a basis of a predetermined determination condition; and storing the two or more types of travel histories in the link in the storage device so as to be sorted for the determined two or more types, wherein the predetermined determination condition involves the traveling positions in the lane.

4. A method of generating a traveling trajectory model using a method of storing a travel history using a controller to store the travel history of a vehicle in a storage device for each link of a traveling path to generate, on a basis of the travel history stored in the storage device, the traveling trajectory model in which a traveling trajectory including at least a passing position of the vehicle and a vehicle speed is modeled, the method of storing the travel history comprising:

determining that one or more travel histories in a link are one type or two or more types of travel histories on a basis of a predetermined determination condition; and storing the two or more types of travel histories in the link in the storage device so as to be sorted for the determined two or more types, wherein when a traveling path ahead of the link branches, the predetermined determination condition involves traveling directions of the vehicle from the link, and the method of generating a traveling trajectory model comprising:

generating two or more types of traveling trajectory models corresponding to the two or more types of travel histories in the link stored in the storage device.

5. An apparatus for storing a travel history, comprising:
a storage device; and
a controller configured to store the travel history of a vehicle in a storage device for each link connecting between nodes in road information,
the controller being further configured to:
when traveling directions of the vehicle branch at a branching point, determine that one or more travel histories in a link on an upstream side of the branching point are one type or two or more types of travel histories on a basis of a predetermined determination condition; and
store the two or more types of travel histories in the link in the storage device so as to be sorted for the determined two or more types,
wherein when a traveling path ahead of the link branches, the predetermined determination condition involves traveling directions of the vehicle ahead of the branching point.

6. An apparatus for storing a travel history, comprising:
a storage device; and
a controller configured to store the travel history of a vehicle in a storage device for each link connecting between nodes in road information,
the controller being further configured to:
when two or more traveling positions of the vehicle exist in a lane ahead of a branching point, determine that one or more travel histories in a link on an upstream side of the branching point and in a link ahead of the branching point are one type or two or more types of travel histories on a basis of a predetermined determination condition; and
store the two or more types of travel histories in the link in the storage device so as to be sorted for the determined two or more types,
wherein the predetermined determination condition involves the traveling positions in the lane.

* * * * *